United States Patent [19]

Harris et al.

[11] Patent Number: 4,932,207
[45] Date of Patent: Jun. 12, 1990

[54] SEGMENTED SEAL PLATE FOR A TURBINE ENGINE

[75] Inventors: Derek P. Harris; Stacey H. Light, both of San Diego, Calif.

[73] Assignee: Sundstrand Corporation, Rockford, Ill.

[21] Appl. No.: 291,063

[22] Filed: Dec. 28, 1988

[51] Int. Cl.⁵ .............................................. F02C 3/08
[52] U.S. Cl. .................... 60/39.32; 60/39.36; 60/760; 415/170.1; 415/172.1; 415/174.2; 415/174.3
[58] Field of Search ............. 60/39.36, 760, 39.31, 60/39.32, 39.75; 417/407, 406; 415/170.1, 172.1, 174.2, 174.3, 174.5, 93, 100

[56] References Cited

U.S. PATENT DOCUMENTS

| | | | |
|---|---|---|---|
| 2,709,893 | 6/1955 | Birmann | 60/39.75 |
| 2,911,138 | 11/1959 | Birmann | |
| 3,115,011 | 12/1963 | Deinhardt et al. | 60/760 |
| 3,116,908 | 1/1964 | Wosika | 415/143 |
| 3,574,478 | 4/1971 | Toth, Jr. | 415/174.5 |
| 3,613,360 | 10/1971 | Howes | 60/39.36 |
| 4,009,568 | 3/1977 | King et al. | 60/39.32 |
| 4,018,043 | 4/1977 | Clemmens | 60/760 |
| 4,439,871 | 4/1984 | Weiler et al. | |
| 4,482,303 | 11/1984 | Acosta | 417/406 |
| 4,794,754 | 1/1989 | Shekleton et al. | 60/760 |

Primary Examiner—Donald E. Stout
Attorney, Agent, or Firm—Wood, Phillips, Mason, Recktenwald & VanSanten

[57] ABSTRACT

The clearance between a seal assembly 48 and a turbine wheel 16 in an engine of the type having a radial outflow compressor 24 and a radial inflow turbine 16 is minimized by forming the seal assembly 48 in part out of a plurality of segments 74 disposed in a circular array and which are relatively movable but sealed to each other. The thermal stress in the segments 74 will be less than in a single ring resulting in an extended life before the onset of cracking and eventual mechanical failure.

13 Claims, 3 Drawing Sheets

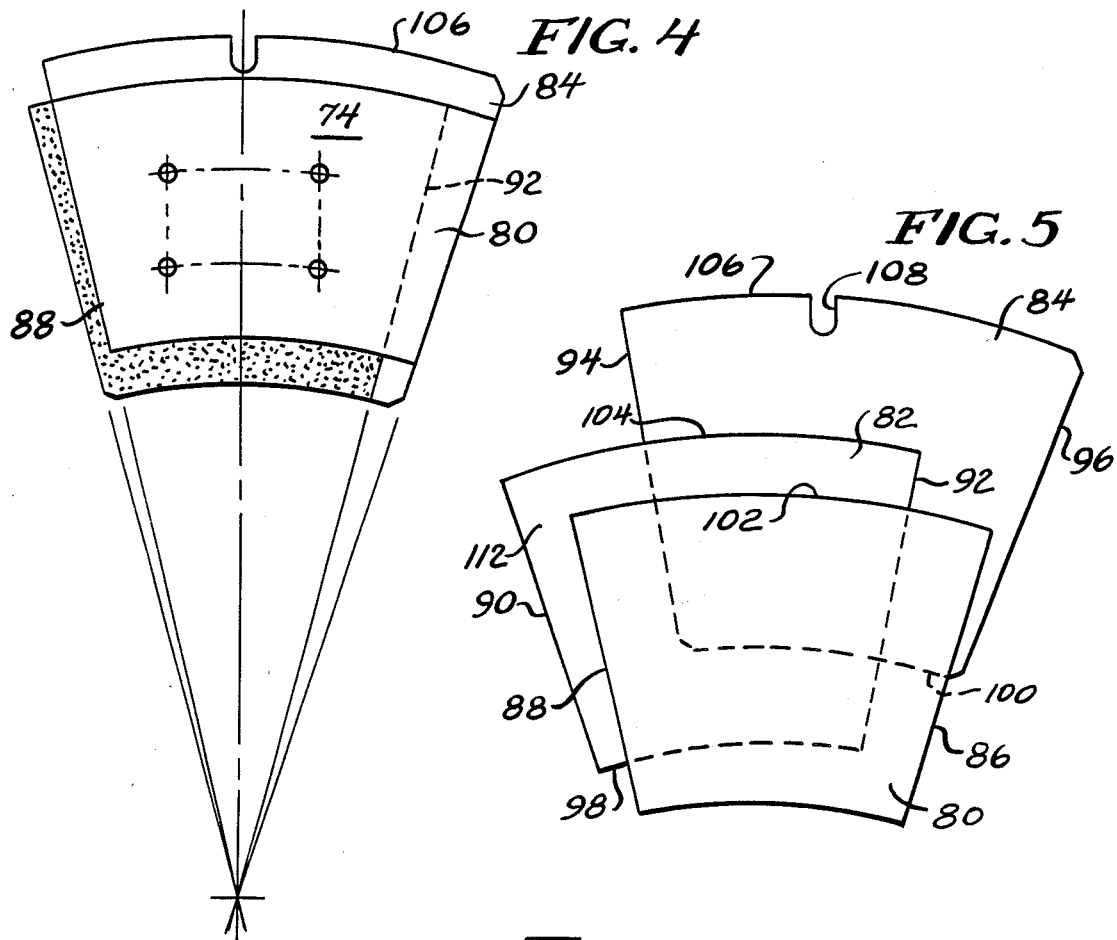
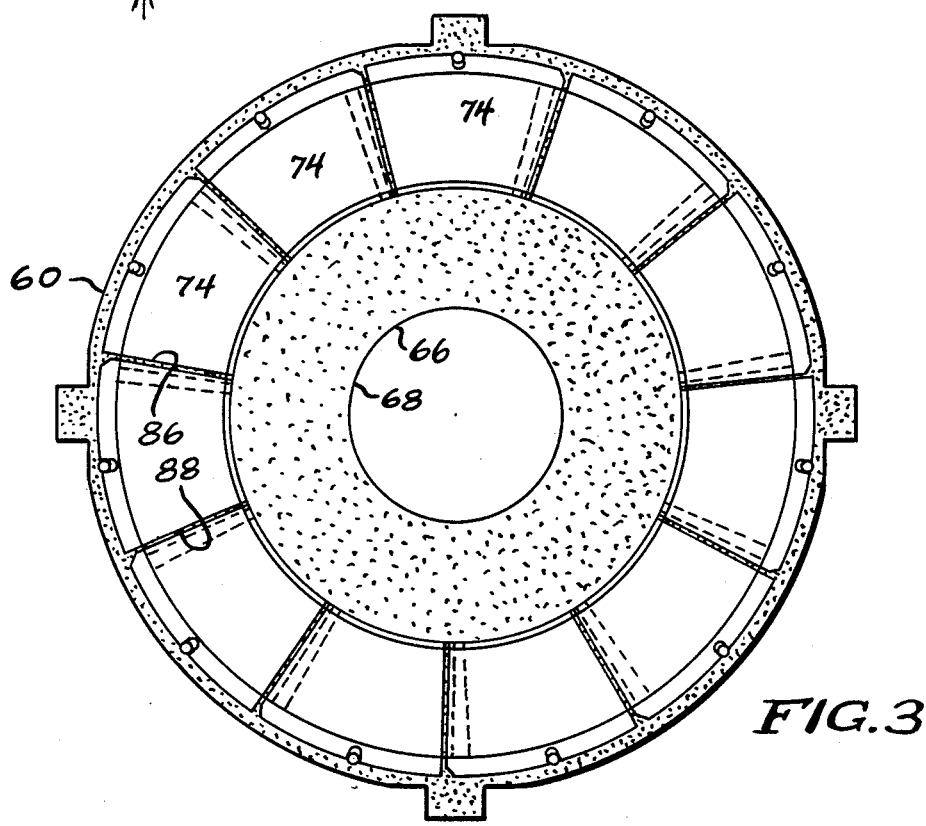

SEGMENTED SEAL PLATE FOR A TURBINE ENGINE

FIELD OF THE INVENTION

This invention relates to turbine engines, and more particularly, to seals utilized to isolate the compressor and turbine sections of turbine engines having radial outflow compressors and radial inflow turbines.

BACKGROUND OF THE INVENTION

In many turbine engines of the type utilizing radial outflow compressors coupled to radial inflow turbines, the compressor and the turbine wheel are located in back to back relationship for compactness. Usually, an annular, narrow space exists between the two for thermal isolation purposes. That is, the space is provided to prevent undue quantities of heat from being transmitted from the turbine wheel to the compressor as a result of heating of the turbine wheel by hot gases of combustion.

While the space achieves such an objective, it presents a difficulty in that it must be sealed to prevent the flow of compressed gas from the compressor side of the machine to the turbine side of the machine through such space at the interface between the rotor and the stator of the machine. Further, the sealing of such space should be such that the seal itself does not transmit unduly large quantities of heat from the turbine side of the engine to the compressor side.

To solve this difficulty, it has been conventional to provide an annular seal made up of two components. A first is a forward seal plate which is secured by any suitable means to the engine stator on the compressor side thereof and which extends into the space between the compressor and the turbine into almost touching relation to the boundary of the space at its radially inner extremity. This seal plate holds down passage of gas from the compressor side to the turbine side of the engine to some desired amount (frequently, a small amount of gas passage is preferred to provide for some rotor cooling). However, it is not capable of preventing heat transfer from the turbine side of the engine to the compressor side.

In order to minimize such heat transfer, prior art seals additionally include a so-called diaphragm which is a relatively thin, ring-shaped piece of metal which is mounted on a forward seal plate near its radially outer periphery and extends radially inwardly therefrom to have its radially inner edge suitably mounted to the seal plate. The main body of the diaphragm is spaced from the seal plate thereby establishing an air pocket between the two which severely impedes heat transfer from the turbine side of the engine to the compressor side.

During engine operation, extremely high temperatures are generated at the turbine side of the engine. As a consequence, the seal plate and the diaphragm are subjected to thermal cycling and the diaphragm in particular experiences significant thermal growth in the process. Furthermore, there is a substantial thermal gradient radially across the seal assembly. These two factors result in distortion of the diaphragm during various operating conditions and will cause cracking leading to eventual failure. In order to prevent such distortion from resulting in interfering contact between the turbine wheel and the diaphragm, the clearance between the two must be kept relatively large. And, of course, utilizing a relatively large clearance increases the leakage flow path between the turbine and seal plate. The natural result is, of course, increased leakage and decreased operational efficiency of the machine.

The present invention is directed to overcoming one or more of the above problems.

SUMMARY OF THE INVENTION

It is the principal object of the invention to provide a new and improved turbine engine. More specifically, it is an object of the invention to provide a turbine engine of the radial discharge compressor--radial inflow turbine type with an improved seal plate whereby clearance between the seal plate and the turbine may be minimized to reduce performance losses.

An exemplary embodiment of the invention achieves the foregoing object in a turbine engine including a radial outflow, rotary compressor and a radial inflow turbine wheel. Means couple the compressor and the turbine wheel in slightly spaced, back to back relation so that the turbine wheel may drive the compressor. A housing surrounds the compressor and the turbine wheel and a stationary seal is mounted on the housing. The stationary seal extends into the space between the compressor and the turbine wheel and includes a main sealing and support section adjacent the compressor and an insulating section adjacent the turbine wheel and mounted on, but generally spaced from, the main support section. The insulating section comprises a plurality of segments disposed in a circular array and angularly movable with respect to each other together with means sealing adjacent segments to each other.

As a result of the foregoing, the necessary air pocket for thermal isolation is provided but the segments are permitted to grow thermally in the circumferential and radial directions. Because they are movable with respect to each other, the thermal growth may be accommodated without distortion and clearance at the turbine wheel may be absolutely minimized.

In a preferred embodiment, the segments are generally pie-shaped and the sealing means between the same comprise tongue and groove connections.

In a preferred embodiment, the segments are mounted to the main section by means that additionally permit thermal growth in the radial direction.

The thermal growth permitting means also comprise tongue and groove connections.

In a preferred embodiment, means are located on one of the main section and the housing for limiting angular movement of the segments on the main section.

In this embodiment of the invention, the limiting means may comprise radial slots in at least some of the segments along with pins in the slots. The pins are carried by either the main section or the housing as desired.

In a highly preferred embodiment, each of the segments is a laminate including a layer facing the turbine wheel and a support sheet oppositely thereof.

As alluded to previously, the sealing means comprise tongue and groove connections and where the segments are laminates, one side edge of each support sheet may be utilized to define a tongue and the other side edge of each support sheet along with the turbine wheel facing layer may be spaced from each other to define a groove.

In a highly preferred embodiment, the support sheet in turn is made up of two layers, one of the layers being in abutment with the turine wheel facing layer and defining the tongue and the other layer of the support sheet being spaced from the turbine wheel facing layer and defining a wall of the groove.

Other objects and advantages will become apparent from the following specification taken in connection with the accompanying drawings.

DESCRIPTION OF THE DRAWINGS

FIG. 3 is a plan view of an assembled seal plate made according to the invention;

FIG. 4 is a plan view of a segment utilized in the seal plate; and

FIG. 5 is an exploded view of the segment.

DESCRIPTION OF THE PREFERRED EMBODIMENT

Figure 1:
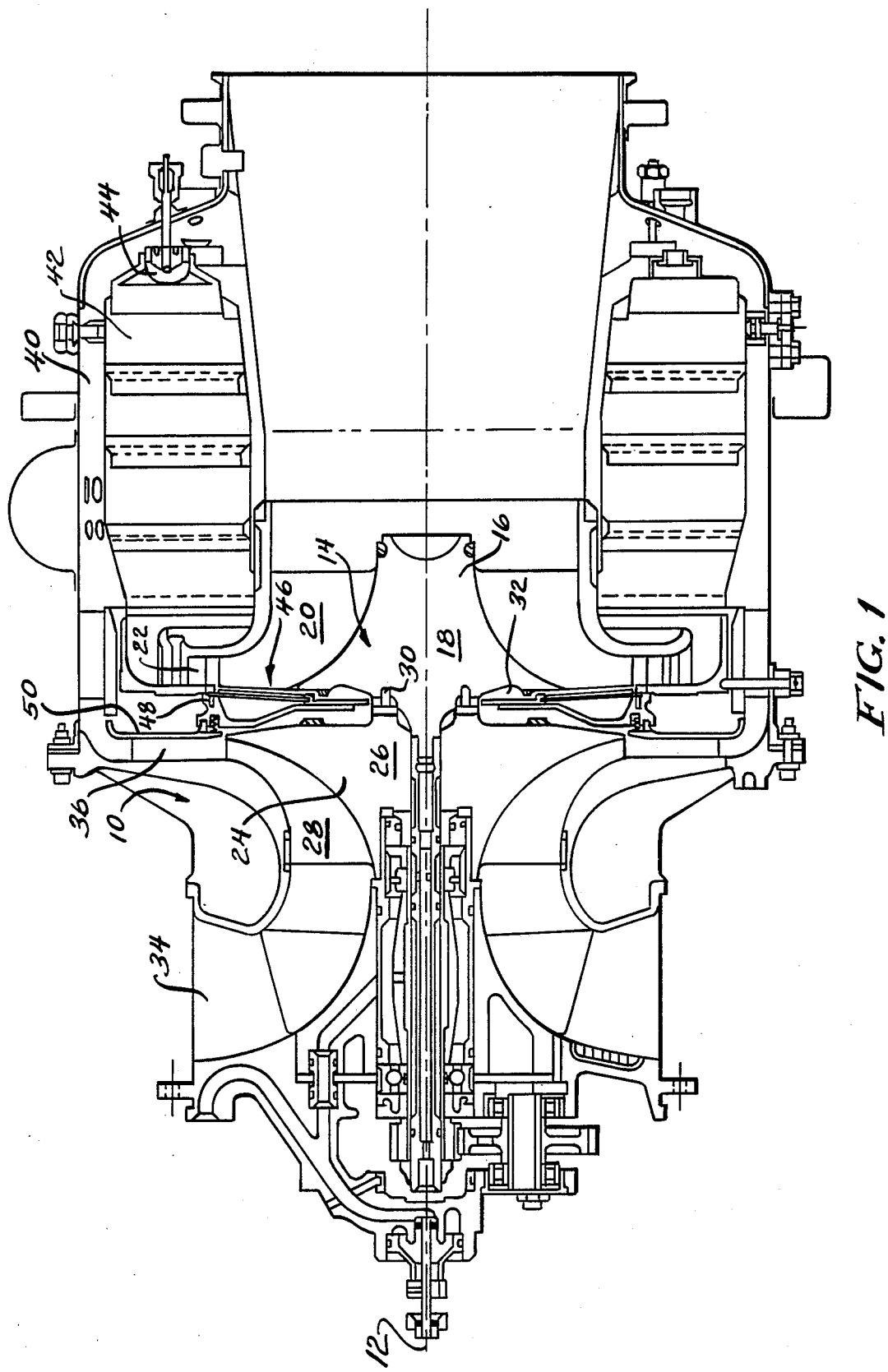
FIG. 1 is a sectional view of a gas turbine engine made according to the invention.

An exemplary embodiment of a gas turbine engine that may be provided with a seal plate according to the invention is illustrated in FIG. 1 and is seen to include a stationary housing, generally designated 10. Journaled within the housing for rotation about an axis 12 is a rotor, generally designated 14. The rotor 14 in turn is made up of a radial inflow turbine wheel 16 having a hub 18 and blades 20 located to receive hot gases of combustion directed radially inward by an annular nozzle 22. The rotor 14 further includes a rotary compressor 24 including a hub 26 and peripheral blades 28. The turbine wheel 16 and compressor 24 are coupled together by any suitable means including, for example, a pin 30, for conjoint rotation. It will be observed that a radially inward directed, annular space 32 exists between the turbine wheel 16 and the compressor 24.

During operation, the air from an inlet 34 to the machine is compressed by the blades 28 and directed radially outwardly through a diffuser 36. Compressed air is then passed through an annular plenum 40 which surrounds an annular combustor 42. Air is admitted to the interior of the combustor 42 as is well known combined therein with fuel injected by injectors 44 to produce gases of combustion. The combustor 42 includes an outlet in fluid communication with the nozzle 22.

To seal the area between the diffuser 36 and the nozzle 22 as well as the space 32, a seal assembly, generally designated 46, is utilized. The seal assembly 46 may be mounted on a part 50 of the housing by conventional means.

Figure 2:
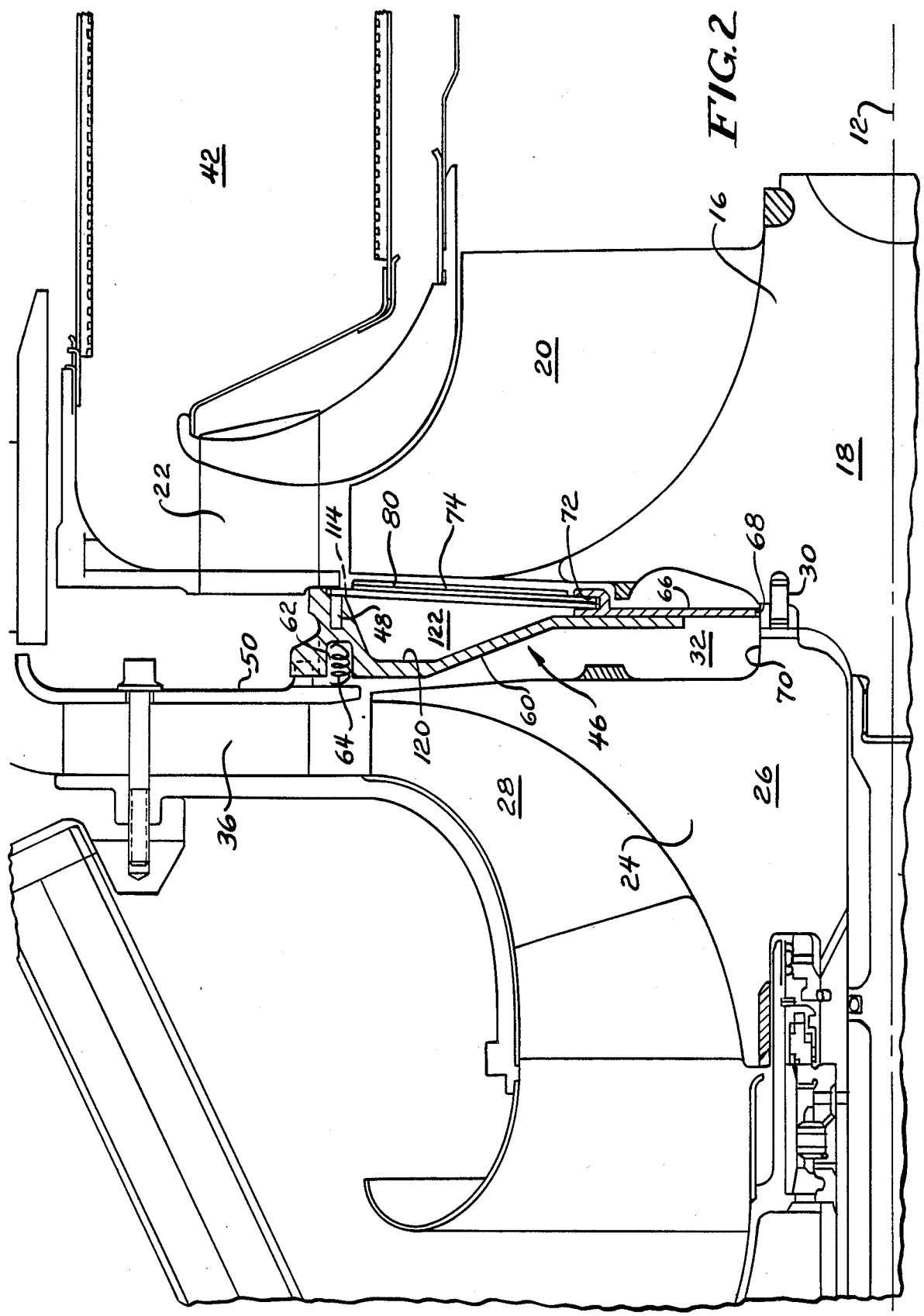
FIG. 2 is an expanded, fragmentary sectional view of the stator-rotor interface of such engine.

Addressing FIGS. 2 and 3, each seal assembly 46 may be seen to be made up of three basic components. The first is a forward seal plate 60 which is ring-like in configuration and which is disposed on the compressor side of the engine. The forward seal plate 60 is the component that is mounted to the housing 10 and which mounts the other two components of the seal assembly 46. An axially opening, peripheral groove 62 at a radially outer extremity of the forward seal plate 60 may receive a seal 64 to seal against the housing part 50 which preferably is part of the diffuser 36.

At its radially inner extremity, the forward seal plate 60 mounts an inner seal plate 66. The two may be secured together in any suitable fashion but their interface should be sealed. The inner seal plate 66 is also ring-like and includes a radially inner, circular edge 68 which is in close proximity to the interface of the rotor 16 and the compressor 24, that is, the radially inner boundary 70 of the space 32.

At its radially outer edge, the inner seal plate 66 includes a radially outwardly opening groove 72.

The third component of the seal assembly 22 is a plurality of segments 74 arranged in a circular array as seen in FIG. 3. The segments 74 may be regarded as somewhat pie-shaped or even trapezoidal with arcuate major and minor bases. The segments 74 are mounted to the seal plates 60 and 66 on the turbine side of the engine near the radially outer periphery of the turbine 16.

In a preferred embodiment, each segment 74 is made up of a three layer laminate. One layer 80 faces and is immediately adjacent the turbine wheel 16. Two other layers 82 and 84 constitute a support sheet and as can be seen from FIGS. 4 and 5 they are offset from one another. Generally, though not necessarily, the layers 80, 82 and 84 will all be made of the same material to avoid the generation of stresses that are associated with thermal growth of different materials which may have differing coefficients of thermal expansion. In addition, the total arc length of the corresponding segments is never equal to 360° although that number is approached. As a consequence, and as seen in FIG. 3, the side edges 86 and 88 of the layer 80 do not touch each other, allowing for thermal growth in the circumferential direction. The same relationship holds true as between the side edges 90 and 92 of the layer 82 and the side edges 94 and 96 of the layer 84.

As can be determined from FIGS. 4 and 5, the radially inner edges 98 and 100 of the layers 82 and 84 respectively are aligned. Similarly, the radially outer edges 102 and 104 of the layers 80 and 82 are aligned while the radially outer edge 106 of the layer 84 extends radially outwardly past both of the edges 102 and 104 and may include a central, radially outwardly opening slot 108.

The side edges 86 and 96 of the layers 80 and 84 are aligned as are the side edges 88 and 94 of those layers. In contrast, the side edge 92 of the layer 82 is angularly recessed from the edges 86 and 96 while the side edge 90 of the layer 82 extends angularly past the edges 88 and 94.

As a result, a circumferentially opening groove is located on the right hand side of each of the segments 74 and a circumferentially projecting tongue 112 is defined by that part of the layer 82 along its left hand edge as viewed in FIGS. 4 and 5. The tongue 112 is sized to be slideably received in the recess in the adjacent segment and essentially seal the interface between the two.

The lower edges 98 and 100 of the layers 82 and 84 are slideably received in the groove 72 in the inner seal plate 66 to provide a seal at that location as well. Finally, the radially outer edge 106 of the layer 84 may abut an axial face 114 (FIG. 2) on the forward seal plate 60 to seal at that location as well.

By forming the forward seal plate 60 to be slightly concave on its surface 120 facing the turbine side of the engine, a dead air insulating space or pocket 122 sealed in the manner mentioned previously is provided.

Pins 124 mounted to the forward seal plate 60 may be disposed in the slots 108 to limit movement of the segments 74 in the circumferential direction so that they do not all "bunch up" at one location on the ring assembly while allowing thermal growth of the segments 74 in the radial direction. Of course, it is not necessary that all of the segments 74 be provided with slots 108 for the pins 48.

It will be readily appreciated that a seal assembly 46 made according to the invention utilizing the segments 74 permits circumferential expansion of that boundary of the dead air space 22 facing the turbine side of the engine. The tongue and groove connection at the bottom edges of the segments to the inner seal plate 66 and the pinned connections at the upper end thereof also provide for expansion in the radial direction. The tongue and groove connection to adjacent segments accommodates thermal growth in the circumferential direction thereby relieving hoop stress and eliminating the resulting cracking. Because the side of the seal assembly 46 facing the turbine side of the engine is broken into two sections, i.e., the section defined by the segments 74 and the section defined by the inner seal plate 66, and the two sections are relatively movable with respect to one another, distortions due to thermal gradients in the radial direction are likewise avoided. As a consequence, the clearance between the layer 80 and the turbine wheel 16 may be minimized thereby reducing the size of the leakage path between the turbine and seal plate thus increasing engine efficiency.

We claim:

1. A gas turbine engine comprising:
   a radial outflow, rotary compressor;
   a radial inflow turbine wheel;
   means coupling said compressor and said turbine wheel in slightly spaced, back to back relation so that said turbine wheel may drive said compressor;
   a housing surrounding said compressor and said turbine wheel; and
   a stationary seal mounted on said housing and extending into the space between said compressor and said turbine wheel, said seal including a main sealing and support section adjacent said compressor and an insulating section adjacent said turbine wheel and mounted on but generally spaced from said main support section; said insulating section comprising a plurality of segments disposed in a circular array and angularly movable with respect to each other, and means sealing adjacent segments to each other.

2. The gas turbine engine of claim 1 wherein said segments are generally pie-shaped and said sealing means comprise tongue and groove connections.

3. The gas turbine engine of claim 2 wherein said segments are mounted to said main section by means permitting thermal growth in the radial direction.

4. The gas turbine engine of claim 3 wherein said thermal growth permitting means comprising tongue and groove connections.

5. The gas turbine engine of claim 1 wherein said segments are mounted to said main section by means permitting thermal growth in the radial direction.

6. The gas turbine engine of claim 1 further including means on one of said main section and said housing for limiting angular movement of said segments on said main section.

7. The gas turbine engine of claim 1 wherein each of said segments is a laminate including a layer facing said turbine wheel and a support sheet opposite thereof.

8. The gas turbine engine of claim 7 wherein said sealing means comprises tongue and groove connections, one side edge of each support sheet defining a tongue, the other side edge of said support sheet along with said turbine wheel facing layer defining a groove.

9. The gas turbine engine of claim 8 wherein said support sheet is made up of two layers, one of said layers being in abutment with said turbine wheel facing layer and defining said tongue, the other layer of said support sheet being spaced from said turbine wheel facing layer and defining a wall of said groove.

10. The gas turbine engine of claim 1 further including means on one of said main section and said housing for limiting angular movement of said segments on said main section, said limiting means comprising radial slots in at least some of said segments and pins in said slots, said pins being carried by one of said main section and said housing.

11. A gas turbine engine comprising:
    a radial outflow, rotary compressor;
    a radial inflow turbine wheel;
    means coupling said compressor and said turbine wheel in slightly spaced, back to back relation so that said turbine wheel may drive said compressor;
    a housing surrounding said compressor and said turbine wheel; and
    a stationary seal mounted on said housing and extending into the space between said compressor and said turbine wheel, said seal including an annular forward seal plate adjacent said compressor, an inner seal plate mounted on said forward seal plate at the radially inner edge thereof and an insulating section adjacent said turbine wheel and mounted on said forward seal plate and said inner seal plate in axially spaced relation to said forward seal plate, said insulating section comprising a plurality of plate-like segments disposed in an interlocked circular array with edges of said segments slideably and sealingly engaging both said plates and each other.

12. The gas turbine engine of claim 11 wherein each of said segments has side edges and tongue and groove connection at said side edges.

13. A gas turbine engine comprising:
    a radial outflow, rotary compressor;
    a radial inflow turbine wheel;
    means coupling said compressor and said turbine wheel in slightly spaced, back to back relation so that said turbine wheel may drive said compressor;
    a housing surrounding said compressor and said turbine wheel; and
    a stationary seal mounted on said housing and extending into the space between said compressor and said turbine wheel, said seal including an annular forward seal plate adjacent said compressor, an inner seal plate mounted on said forward seal plate at the radially inner edge thereof and an insulating section adjacent said turbine wheel and mounted on said forward seal plate and said inner seal plate in axially spaced relation to said forward seal plate, said insulating section comprising a plurality of plate-like segments disposed in a circular array, each segment including at least one mounting layer and an insulating layer with the insulating layer facing said turbine wheel, said layers being slightly offset from one another so that corresponding side edges of said mounting layers overlap and slideably abut opposite side edges of said insulating layers, the total arc length of said respective layers approaching, but not attaining, 360° so as to allow thermal growth in the circumferential direction.

* * * * *